(12) United States Patent
Espinoza

(10) Patent No.: US 11,325,826 B2
(45) Date of Patent: May 10, 2022

(54) REFUELING VEHICLE

(71) Applicant: Booster Fuels, Inc., San Mateo, CA (US)

(72) Inventor: David Espinoza, Granbury, TX (US)

(73) Assignee: Booster Fuels, Inc., San Mateo, CA (US)

( * ) Notice: Subject to any disclaimer, the term of this patent is extended or adjusted under 35 U.S.C. 154(b) by 0 days.

(21) Appl. No.: 16/683,094

(22) Filed: Nov. 13, 2019

(65) Prior Publication Data

US 2021/0139313 A1   May 13, 2021

Related U.S. Application Data

(60) Provisional application No. 62/933,100, filed on Nov. 8, 2019.

(51) Int. Cl.
| | | |
|---|---|---|
| *B67D 7/84* | (2010.01) | |
| *B67D 7/40* | (2010.01) | |
| *B60Q 1/26* | (2006.01) | |
| *B67D 7/32* | (2010.01) | |
| *B67D 7/04* | (2010.01) | |
| *B67D 7/78* | (2010.01) | |
| *B60P 3/22* | (2006.01) | |
| *B60Q 1/50* | (2006.01) | |
| *B62D 65/04* | (2006.01) | |
| *B62D 65/12* | (2006.01) | |

(52) U.S. Cl.
CPC .............. *B67D 7/845* (2013.01); *B60P 3/226* (2013.01); *B60P 3/2265* (2013.01); *B60Q 1/2692* (2013.01); *B60Q 1/50* (2013.01); *B67D 7/04* (2013.01); *B67D 7/32* (2013.01); *B67D 7/40* (2013.01); *B67D 7/78* (2013.01); *B62D 65/04* (2013.01); *B62D 65/12* (2013.01); *B67D 2210/00136* (2013.01)

(58) Field of Classification Search
CPC . B67D 7/845; B67D 7/32; B67D 7/78; B67D 7/04; B67D 7/40; B67D 2210/001; B60Q 1/2692; B60Q 1/50; B60P 3/2265; B60P 3/226; B60P 3/22; B60P 3/2215; B60P 3/2225; B60P 3/2245; B63D 65/04; B63D 65/12
USPC ......................... 362/493, 524, 534; 340/433
See application file for complete search history.

(56) References Cited

U.S. PATENT DOCUMENTS

| | | | |
|---|---|---|---|
| 1,834,557 A | * | 12/1931 | Van Duyn ................ B60Q 1/44 116/52 |
| 5,906,406 A | | 5/1999 | Pajakowski |
| 6,339,736 B1 | | 1/2002 | Moskowitz et al. |
| 7,478,747 B2 | | 1/2009 | Call et al. |
| 7,503,338 B2 | * | 3/2009 | Harrington .......... A01G 25/162 137/355.16 |
| 7,905,535 B2 | | 3/2011 | Zentner |
| 8,051,882 B2 | * | 11/2011 | Koeninger ............. B67D 7/346 141/95 |
| 9,586,805 B1 | * | 3/2017 | Shock ....................... B67D 7/62 |
| 10,351,055 B2 | * | 7/2019 | Maiorana ............... B60Q 1/486 |

(Continued)

*Primary Examiner* — Jason K Niesz
(74) *Attorney, Agent, or Firm* — Weaver Austin Villeneuve & Sampson LLP

(57) ABSTRACT

A refueling vehicle may have a front fuel dispensing module with at least one or more hoses for dispensing fuel product from the fuel tank to an external tank. The front fuel dispensing module is located between the cab and the fuel tank containing the fuel product.

18 Claims, 9 Drawing Sheets

(56) References Cited

U.S. PATENT DOCUMENTS

| | | |
|---|---|---|
| 2004/0007286 A1* | 1/2004 | Kamikozuru ............. F17C 5/02 |
| | | 141/231 |
| 2006/0076768 A1* | 4/2006 | Kuntz ................... B60P 3/2245 |
| | | 280/830 |
| 2006/0272740 A1* | 12/2006 | Poulter .................... B67D 7/78 |
| | | 141/231 |
| 2006/0293849 A1 | 12/2006 | Baldwin |
| 2009/0005902 A1 | 1/2009 | Megiddo |
| 2009/0315729 A1 | 12/2009 | Inhoffer |
| 2011/0025267 A1 | 2/2011 | Kamen et al. |
| 2011/0172816 A1 | 7/2011 | Ezra |
| 2013/0013183 A1 | 1/2013 | Surnilla et al. |
| 2013/0099893 A1 | 4/2013 | Kulinets et al. |
| 2013/0247882 A1 | 9/2013 | Espinoza |
| 2013/0282500 A1 | 10/2013 | Latorre |
| 2014/0129379 A1 | 5/2014 | Tryba |
| 2014/0305545 A1 | 10/2014 | Butler, Jr. |
| 2017/0326982 A1 | 11/2017 | Williams et al. |
| 2018/0354409 A1* | 12/2018 | Maiorana ............. B60P 3/2205 |

\* cited by examiner

```
                          ┌─ Start ─┐
                                │
```

Actuating one or more safety light bars mounted on the refueling vehicle to form a safe working zone, where each of the light safety bars is attached to a mechanical arm that uses an actuator to go from a vertical orientation to a horizontal orientation that extends outward,
702

Going out of the refueling vehicle to a front fuel dispensing module located between a cab of the refueling vehicle and a tank containing the fuel product, where the front fuel dispensing module is also located within the safe working zone created by the one or more safety light bars mounted on the refueling vehicle
704

Starting fueling operation to dispense the fuel product from a hose in the front fuel dispensing module
706

Fig. 7A        Cont.

```
                    ┌──────┐
                    │ Cont.│
                    └──────┘
                        │
┌───────────────────────────────────────────────────────────┐
│                                                           │
│ After completing the fueling operation, restoring the hose on a hose reel │
│ to its stowage position in the front fuel dispensing module │
│                                                           │
│                                                       708 │
└───────────────────────────────────────────────────────────┘
                        │
┌───────────────────────────────────────────────────────────┐
│                                                           │
│ Entering into a safety of the cab of the refueling vehicle from the front fuel │
│ dispensing module located right behind the cab            │
│                                                           │
│                                                       710 │
└───────────────────────────────────────────────────────────┘
                        │
┌───────────────────────────────────────────────────────────┐
│                                                           │
│ Actuating the one or more safety light bars mounted on the refueling │
│ vehicle via the actuator to go from the horizontal orientation that extends │
│ outward back up into the vertical orientation.            │
│                                                       712 │
└───────────────────────────────────────────────────────────┘
                        │
        Fig. 7B      ┌──────┐
                     │ End  │
                     └──────┘
```

The LED light assembly attached to the mechanical arm is flexible and is designed to bend when the LED light assembly brushes or hits against an object. The mechanical arm also has a pin connection to allow the arm to be disconnected. The mechanical arm is configured to have a pin connection with a detachable pin to allow the mechanical arm to be disconnected when either the safety light bar or the mechanical arm gets stuck in a horizontal extended outward position.

Figure 8

REFUELING VEHICLE

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATIONS

This patent application claims priority to and benefit under 35 USC 119 to U.S. Provisional Patent Application No. 62/933,100, filed Nov. 8, 2019, titled "An Improved Refueling Vehicle," which is hereby incorporated herein by reference in its entirety.

FIELD

Embodiments generally relate to an improved refueling vehicle.

BACKGROUND

Refueling vehicles, such as a tanker, have traditionally been used to deliver a large amount of gasoline to an underground tank of a gas station.

SUMMARY

Provided herein are some embodiments. In an embodiment, the design is directed to an improved refueling vehicle. The improved refueling vehicle can have many improvements such as front fuel dispensing module, dual hoses and hose reels, a fuel tank with multiple compartments and reinforcements, overfill protection for the tank, pumping system for dispensing multiple different kinds of fuel product, a light saber/safety light bars forming a working zone, a Central command module installed in the vehicle, and many more improvements.

In an embodiment, a refueling vehicle may have a front fuel dispensing module with at least one or more hoses for dispensing fuel product from the fuel tank to an external tank. The front fuel dispensing module is located between the cab and the fuel tank containing the fuel product.

These and other features of the design provided herein can be better understood with reference to the drawings, description, and claims, all of which form the disclosure of this patent application.

BRIEF DESCRIPTION OF THE DRAWINGS

The multiple drawings refer to the example embodiments of the design.

FIGS. 7A and 7B illustrate a flow diagram of an embodiment of actuating one or more safety light bars mounted on the refueling vehicle to form a safe working zone.

FIG. 8 illustrates a flow diagram of an embodiment of a mechanical arm.

Figure 1:
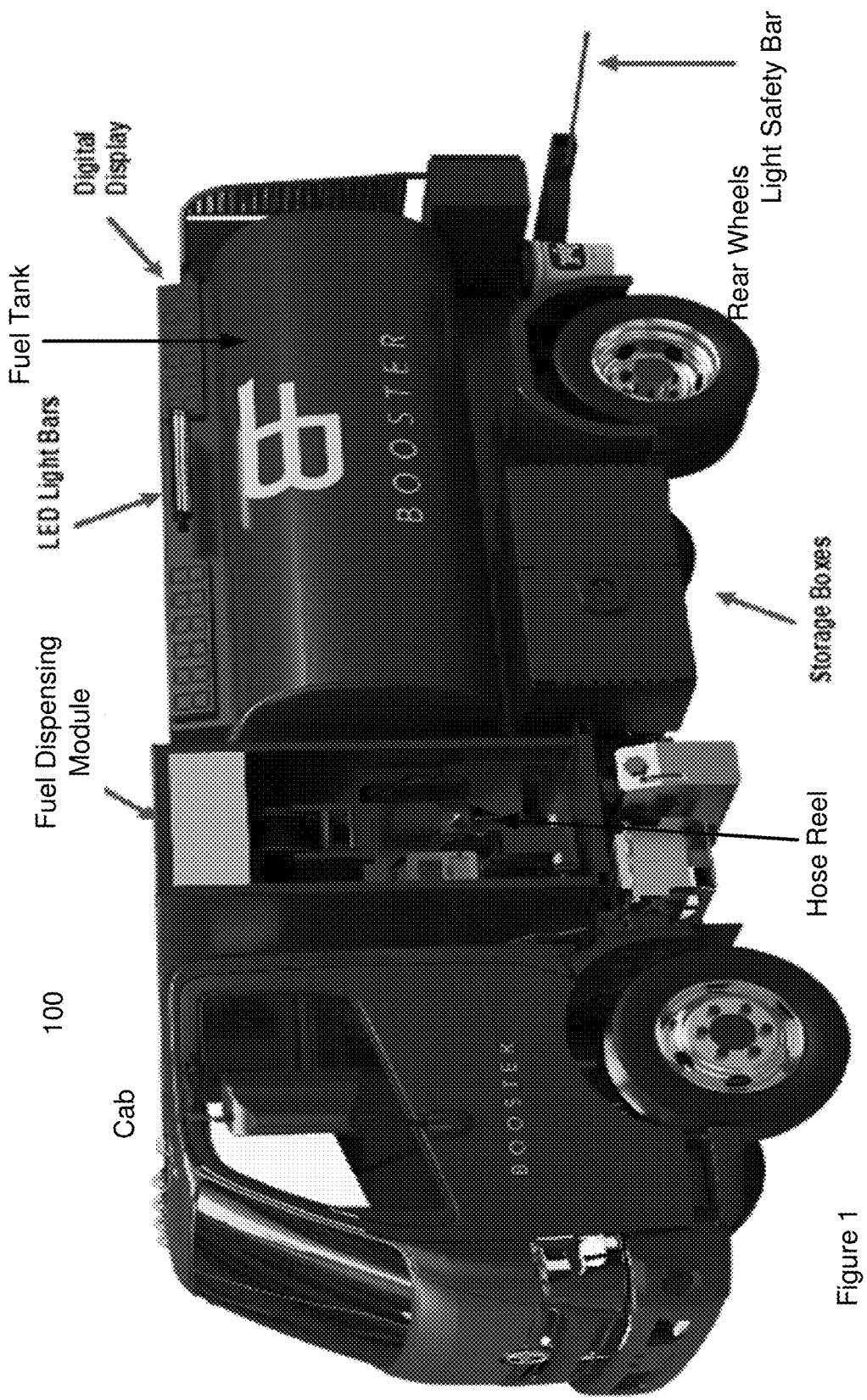
FIG. 1 illustrates a diagram of an embodiment of a front fuel dispensing module located between the cab and the tank containing the fuel product.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first refueling vehicle, can be made. However, the specific numeric reference should not be interpreted as a literal sequential order but rather interpreted that the first refueling vehicle is different than a second refueling vehicle. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

The refueling vehicle has many features and some example features will be discussed below.

FIG. 1 illustrates a diagram of an embodiment of a front fuel dispensing module located between the cab and the tank containing the fuel product. The refueling vehicle 100 can include many components including a cab, a fuel tank, wheels, and a front fuel dispensing module. The fuel tank contains fuel product such as gasoline, diesel, jet fuel, etc. A front axle is connected to a set of front wheels, which are located under the cab. A rear axle connects to a set of rear wheels, which are located under the fuel tank. The front fuel dispensing module is located between the cab and the tank containing the fuel product. The front fuel dispensing module has at least one or more hoses for dispensing fuel product from the fuel tank to an external tank.

The front fuel dispensing module can be a 24" wide cabinet behind the cab with roll up doors on each side. Inside the front fuel dispensing module there is a driver-side hose reel with a first hose on a driver's side of the refueling vehicle 100 and a curbside hose reel with a second hose on a curbside side of the refueling vehicle 100 so an operator can deliver fuel product from both sides of the refueling vehicle 100 through at least one of the hoses without having to reposition the refueling vehicle 100. (E.g. See FIG. 5). The certified flow meter can be in this cabinet and the register can be mounted in the cab. The module can further include the fueling nozzle with auto shutoff and a water-absorbing micron filter/separator. An optional second flow meter can be used if two different fuel products are being carried, such as gasoline and diesel; and thus, two different fuel products are capable of being dispensed from the same refueling vehicle 100. The fuel tank can have an aluminum i) square tank design and/or ii) oval shaped tank, with full skirting to create a smooth uniform tank layout.

The refueling vehicle 100 may include Mini Tankers, Diesel Refuelers, and Pickup Refuelers, and other trucks. The refueling vehicle 100 may be implemented in several different designs as shown in the example drawings and images. The refueling vehicle 100 is built and assembled in compliance with all applicable standards and requirements including NFPA 30A, NFPA 385, CFR 172, IFC Chapter 57 and FMCSA DOT 406.

Figure 2:
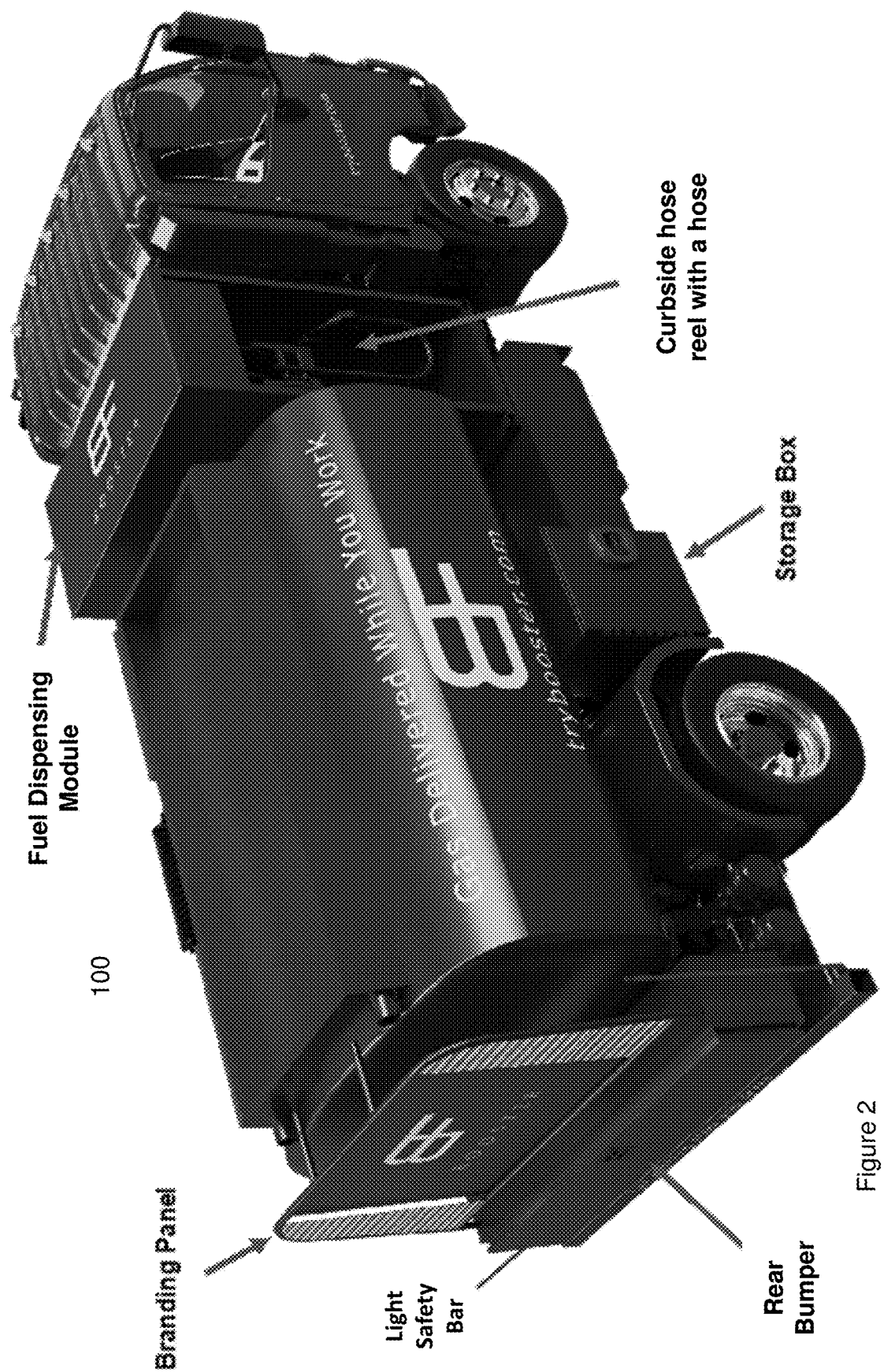
FIG. 2 illustrates a diagram of an embodiment of the front fuel dispensing module containing both a driver-side hose reel with a first hose on a driver's side of the refueling vehicle and a curbside hose reel with a second hose on a curbside side of the refueling vehicle.

FIG. 2 illustrates a diagram of an embodiment of the front fuel dispensing module containing both a driver-side hose reel with a first hose on a driver's side of the refueling vehicle and a curbside hose reel with a second hose on a curbside side of the refueling vehicle. Thus, the refueling vehicle 100 has dual hoses and dual hose reels: one hose reel on the curb side and another hose reel on the driver side compared to a standard refueling truck, which just has one hose reel generally on the back of the truck.

In an example, each hose reel may be electrically powered to rewind a fuel hose, such as a −1 inch×50 foot hose. The hose may be a low permeability hose. Note, the hose may have a removable fuel nozzle to allow for faster tank-to-tank fuel product transfers. Alternatively, the hose may have a spliced connection, such as a 2" drylock, for an API connector for a tank-to-tank fuel product transfer to an external storage tank. The external storage tank can be located in the ground or on another refueling vehicle 100. In an embodiment, each hose has its own spliced connection leading to a connector for a tank-to-tank fuel product transfer. The connector for the tank-to-tank fuel product transfer is located between a fuel nozzle on that hose and a pump supplying the fuel product. The hose size and its larger sized connector for a tank-to-tank fuel product transfer allow a 30 GPM flow rate vs 10 GPM limit through a fuel nozzle.

Note, the hose reel may be a spring rewind hose reel with i) a shutoff valve, ii) a ¾" (up to 1")×50 foot petroleum hose, and iii) a fuel dispensing nozzle. Alternatively, the hose reel can be an electric-powered rewind hose reel. Again, a separate hose and hose reel can be used for dispensing each of the two or more different types of fuel product, such as gasoline and/or diesel.

Figure 3:
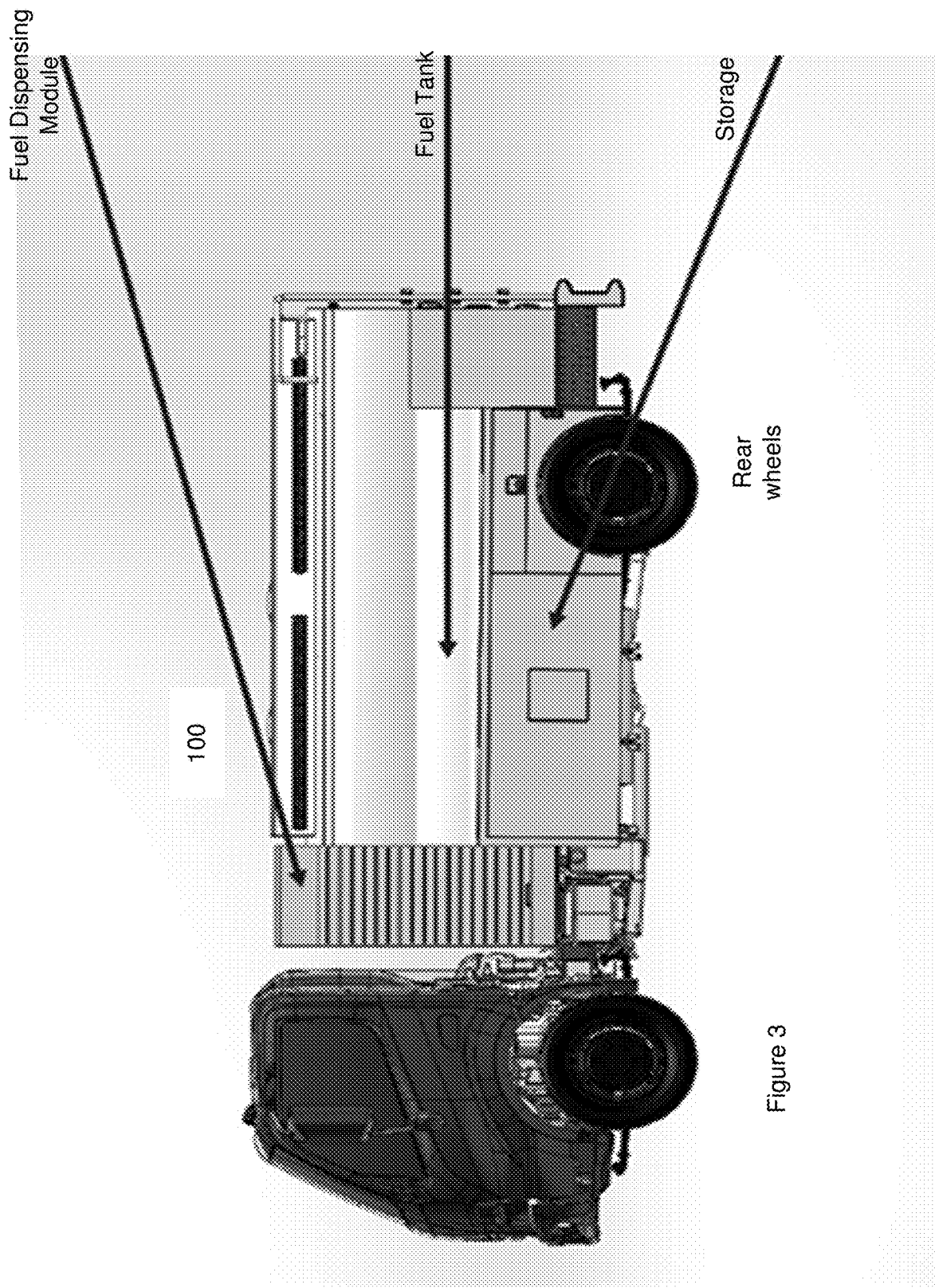
FIG. 3 illustrates a diagram of an embodiment of the fuel tank located behind the fuel dispensing module and over the rear axle and the set of rear wheels.

FIG. 3 illustrates a diagram of an embodiment of the fuel tank is located behind the fuel dispensing module and over the rear axle and the set of rear wheels. The fuel tank of the refueling vehicle 100 is located behind the fuel dispensing module and over the rear axle and the set of rear wheels in order to make a weight of the fuel tank and its gallons of fuel product to be better distributed over both the front and rear axles.

FIG. 2 also illustrates a diagram of an embodiment of a start of the fuel tank that begins after the fuel dispensing module and a remainder of the fuel tank stretches over the rear axle and the set of rear wheels near a rear bumper of the refueling vehicle 100.

The fuel tank can have an aluminum i) square tank design (e.g. see FIG. 2) and/or ii) oval/elliptical shaped tank (e.g. see FIG. 1), with full skirting to create a smooth uniform tank layout above the rear wheels behind the front fuel dispensing module.

Figure 4:
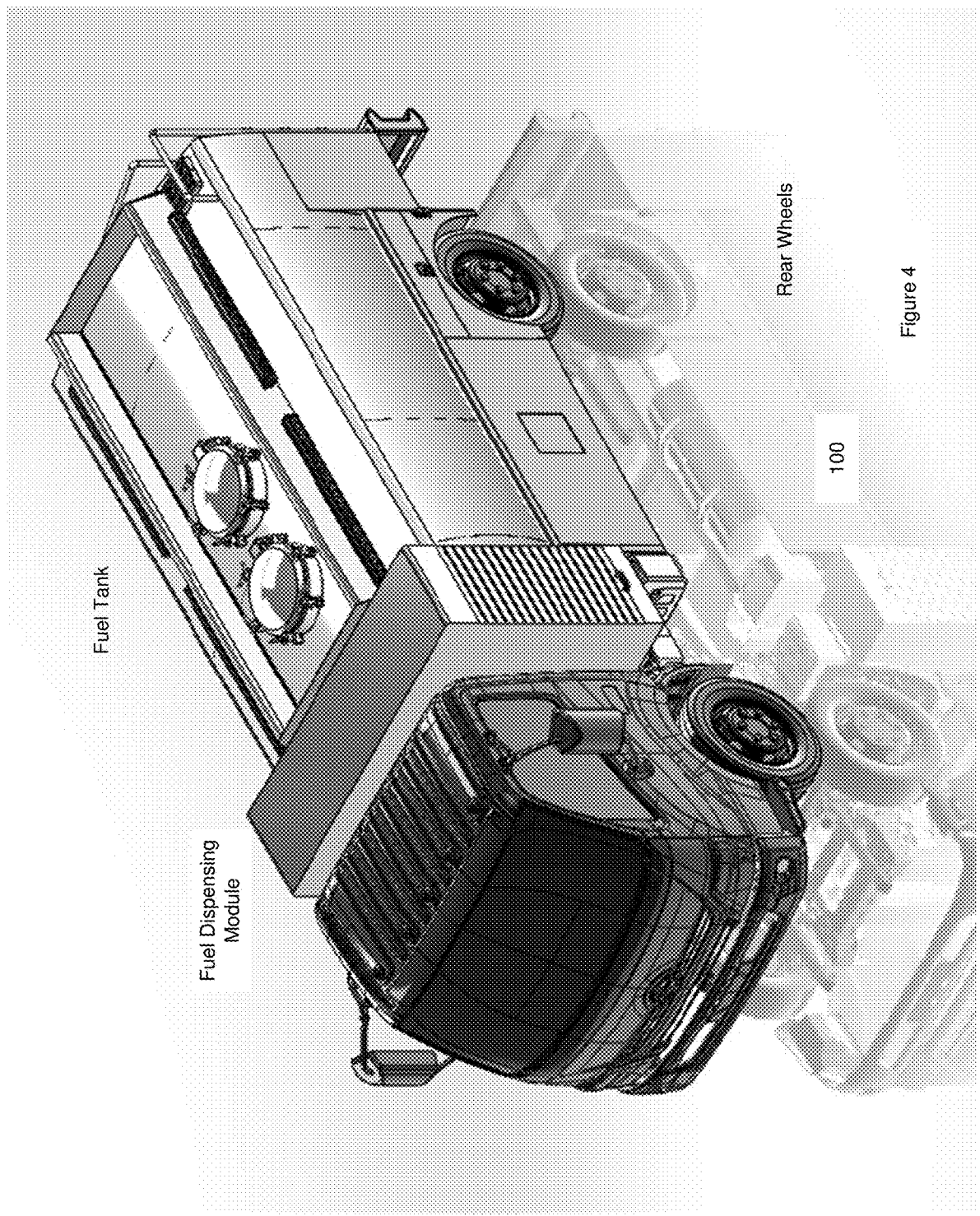
FIG. 4 illustrates a diagram of an embodiment of fuel tank located after the fuel dispensing module.

Again, the fuel tank is no longer directly behind the cab of the refueling vehicle 100 but rather the fuel tank is located after the fuel dispensing module. (E.g. see FIG. 4). A start of the fuel tank begins after the fuel dispensing module and a remainder of the fuel tank stretches over the rear axle and the set of rear wheels near a rear bumper of the refueling vehicle 100 in order to better distribute the weight of the fuel tank and its gallons of fuel product to over both the front and rear axles; and thus, put less weight of the fuel tank and its gallons of fuel product on mainly the front axle when braking the refueling vehicle 100. Thus, by placing the fuel dispensing module in the front of the refueling vehicle 100 that then puts the weight of the tank to be more evenly and/or better distributed over both the front and rear axles; and thus, put less weight of the tank and its gallons of fuel product on mainly the front axle when the gallons of fuel product and its tank are moving in a forward direction and the brakes of the vehicle are trying to stop the entire vehicle. Accordingly, this design with better weight distribution across both wheel axles translates to better braking distance for the refueling vehicle 100. Also, this design with the better weight distribution of the fuel tank also helps in minimizing structural damage due to weight effects on the front axle.

In addition, the refueling vehicle 100 now is effectively longer in wheel base by moving the tank and the rear wheels more to the rear of the vehicle even though the overall length of the vehicle from bumper to bumper remains approximately the same. The rear wheels compared to a standard refueling truck have been moved aft or rear so that the wheels are positioned underneath the tank aft or rear of the center of the tank. The rear wheels are closer to the bumper of the vehicle. Again, the rear axle and wheels now assume more of the weight load from that fuel tank and its gallons of fuel product removing some of that weight distribution from the front axle. The overhang portion of the fuel tank from the rear wheels is now far less distance from the rear wheels to the back bumper than in a standard wheel on standard refueling vehicle.

Figure 5:
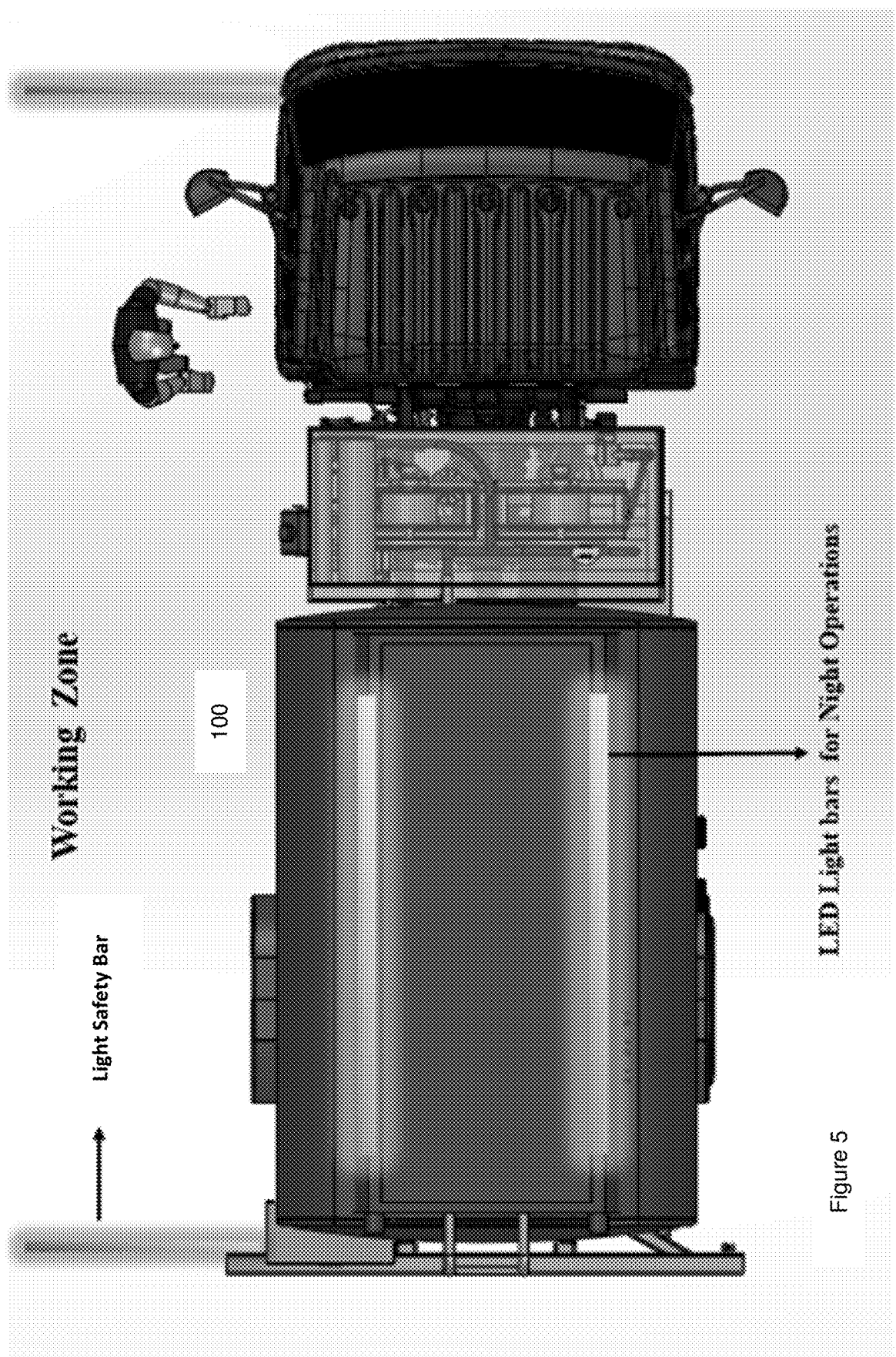
FIG. 5 illustrates a diagram of an embodiment of the safety light bars forming a working zone.

FIG. 5 illustrates a diagram of an embodiment of the safety light bars forming a working zone. FIG. 5 also illustrates a diagram of an embodiment of the safety light bars attached to its own mechanical arm that uses an actuator to go from a vertical orientation to a horizontal orientation that extends outward.

The fuel module upfront allows the creation of a rapidly and safely established work zone with the safety light bars. One or more safety light bars can be used to form a safe working zone for the refueling vehicle 100. The safety light bars use an actuator to go from a vertical orientation to a horizontal orientation that extends outward. The safety light bar, like a stop sign on a school bus, can be mechanically changed from the vertical position to the horizontal position. Note, FIG. 6 shows an example of the safety light bar in a vertical orientation on the refueling vehicle 100.

Each of the safety light bars is generally made up of durable LEDs. The LEDs are attached electrically and mechanically to the mechanical arm.

Figure 6:
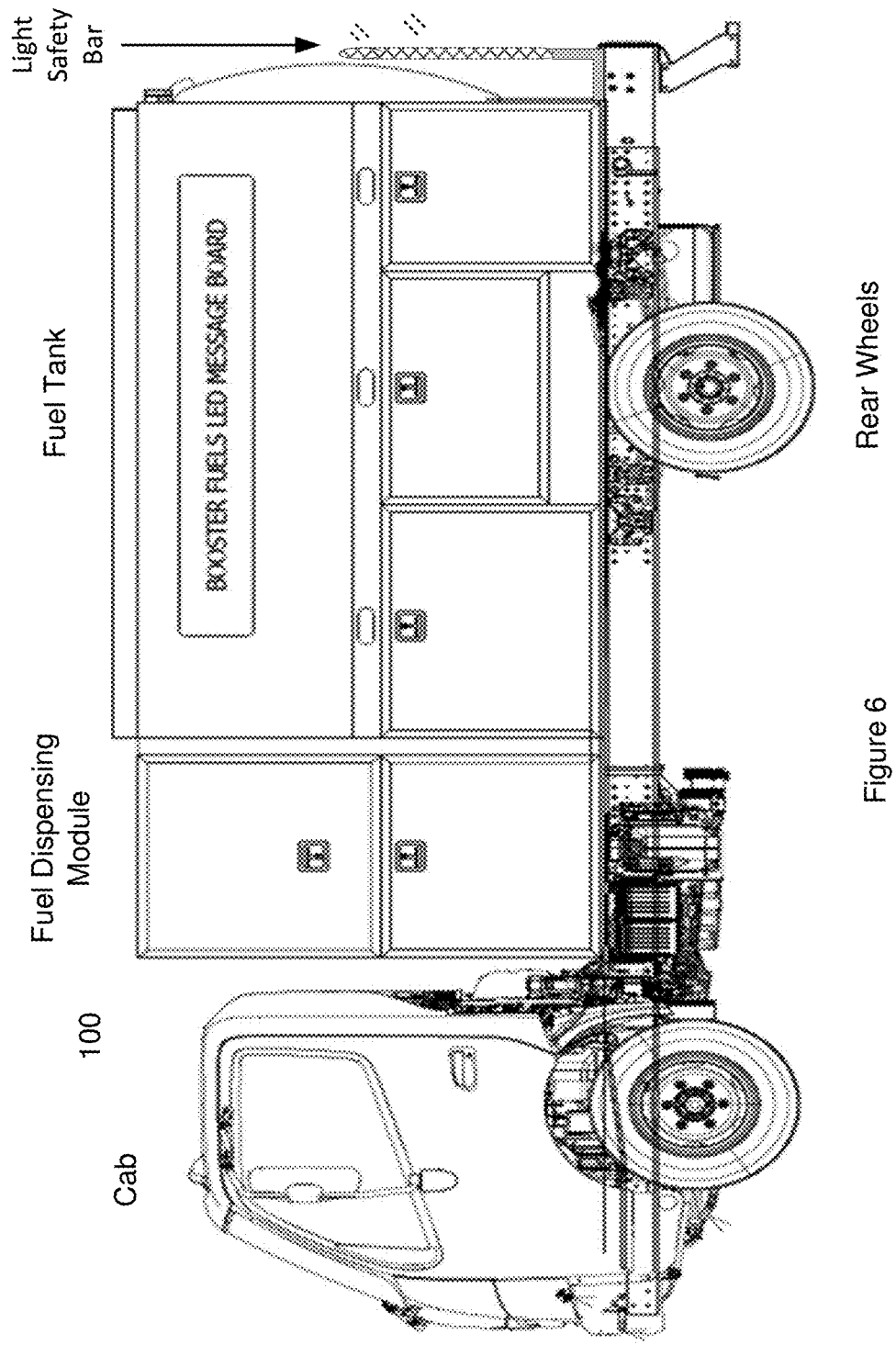
FIG. 6 illustrates a diagram of an embodiment of one or more safety light bars that are made up of LEDs in a vertical orientation.

FIG. 6 illustrates a diagram of an embodiment of one or more safety light bars that are made up of LEDs in a vertical orientation. The mechanical actuator can have an electrical harness run along outside the mechanical actuator or electrical cables run inside of the mechanical actuator to power the LEDs on the mechanical arm. The safety light bar can either use LEDs that are configured to be i) bright continuous lights, ii) flashing lights, or iii) a combination of bright and flashing lights when in a horizontal orientation that extends outward. The LEDs may be tribal whip LEDs. The LEDs/lights are bright or flash to keep vehicular traffic from getting close to the work zone. All lighting on the light safety bar will be LEDs with vapor proof wiring as well as lighting that meets all federal motor vehicle safety standards.

Referring to FIG. 8, the LED light assembly attached to the mechanical arm is flexible and is designed to bend when the LED light assembly brushes or hits against an object. The mechanical arm also has a pin connection to allow the arm to be disconnected. The mechanical arm is configured to have a pin connection with a detachable pin to allow the mechanical arm to be disconnected when either the safety light bar or the mechanical arm gets stuck in a horizontal extended outward position.

Extending the safety light bar from the vertical position to the horizontal position with the lights on creates the safe work zone, which allows a large time savings and safe work area for the refueling operation from the front fuel module.

The layout of the fuel module up front in the refueling vehicle 100, cabinets, and configuration saves time while improving safety. The fuel module behind the cab saves up to one minute per fueling. The safety light bar can cooperate to provide increased safety with some LED light bars mounted along the top of the refueling vehicle 100.

The layout of the fuel module up front in the refueling vehicle 100 with the light saber reduces both steps and time for fueling operations while improving operator safety. A previous technique could use the following steps.

1) Operator steps out of the truck;
2) Operator walks to the back of the truck to pick up cones;
3) Operator places the cones to establish a safety zone;
4) Operator walks back to the truck to lift the nozzle and start fueling procedure;

Note, on average these 4 steps can take 32 seconds to perform.

5) After a fueling operation, the operator returns the fuel nozzle to the fuel module on the back of the truck;
6) Operator proceeds to pick up the cones;
7) Operator places the cones on the back of the truck; and
8) Operator returns to the cab. The total time can be well over a minute to take all 8 steps.

FIGS. 7A and 7B illustrate a flow diagram of an embodiment of actuating one or more safety light bars mounted on the refueling vehicle to form a safe working zone. An operator can take the following steps with the safety light bars to do fueling operation.

1) In step 702, the operator actuates the safety light bars mounted on the refueling vehicle to form a safe working zone. Each of the safety light bars can be attached to a mechanical arm that uses an actuator to go from a vertical orientation to a horizontal orientation that extends outward.

2) In step 704, the operator steps out of the refueling vehicle to go to a front fuel dispensing module located between a cab of the refueling vehicle and a tank containing the fuel product. The front fuel dispensing module is also located within the safe working zone created by the one or more safety light bars mounted on the refueling vehicle. The operator walks to the side of the truck to start fueling operation.

3) In step 706, the operator starts the fueling operation to dispense the fuel product from a hose in the front fuel dispensing module.

Note, on average these three steps can take 5 seconds to perform.

4) In step 708, after the fueling operation, the operator places the hose and nozzle back on the hose reel in front fuel dispensing module on the driver's side. The operator restores the hose on the hose reel to its stowage position in the front fuel dispensing module.

5) In step 710, the operator steps back on the truck, entering into the safety of the cab of the refueling vehicle from the front fuel dispensing module located right behind the cab.

6) In step 712, the operator deactivates the safety light bars and they raise back up to the vertical position. Thus, the operator actuates the one or more safety light bars mounted on the refueling vehicle via the actuator to go from the horizontal orientation that extends outward back up into the vertical orientation.

Note, on average these three steps also take another 5 seconds to perform. The total time for the six steps (not including the actual time to dispense the fuel product) takes about 10 seconds.

The refueling vehicle may use a command module which can include an easy-to-read display screen. The command module can include a wireless/cellular data transfer system. The wireless/cellular data transfer kit will have a radio modem and an antenna. The command module can facilitate refueling by mobile fuel carriers of vehicles of approved users at approved mobile refueling locations. The system may include a server connected to a network and a database accessible by the server that includes approved refueling location information and approved user and user vehicle information, including vehicle identification fuel preference information. The command module communicates with the server via the network, the command module receives refueling request information including user identification and vehicle location information from the server. The server sends these refueling instructions to the command module having its user interface which allows updating of route information with real-time information pertaining to user requests and fuel carrier location data. The command module can include at least one non-transitory processor-readable medium that stores at least one of processor-readable data or processor-executable instructions; and at least one processor communicably coupled to the at least one non-transitory processor-readable medium and to at least one data communications channel. The instructions executed by the at least one processor can perform many functions discussed herein. For example, the instructions executed by the at least one processor can determine a target vehicle to be refueled; to receive location information for the target vehicle over the at least one data communications channel; and to provide refueling vehicle GPS location, and the refueling instructions and location information for the target vehicle.

Network

A number of electronic systems and devices can communicate with each other in a network environment in accordance with the embodiments discussed herein. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first refueling vehicle, a second refueling vehicle, and the like. The client computing system can include, for example, the software application or the hardware-based system in which may be able exchange communications with the first refueling vehicle, and/or the second refueling vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. Alternatively, a resident application on the device rather than the browser may directly call and communicate with the backend server. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. The computing systems are specifically configured and adapted to carry out the processes discussed herein. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

It should be noted that the present design can be carried out on a computing system. However, the present design can be carried out on a server, a computing device devoted to message handling, or on a distributed system in which different portions of the present design are carried out on different parts of the distributed computing system.

Another device that may be coupled to bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module can be implemented in electronic hardware, software instruction cooperating with one or more memories for storage and one of more processors for execution, and a combination of electronic hardware circuitry cooperating with software.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed:

1. A refueling vehicle, comprising:
   a cab;
   a fuel tank having multiple compartments configured to simultaneously and separately carry multiple fuel types;
   a front axle and set of front wheels;
   a rear axle and a set of rear wheels;
   a fuel dispensing module with at least one or more hoses configured to dispense fuel product from the fuel tank to an external tank; and
   a driver-side hose reel with a first hose on a driver's side of the refueling vehicle and a curbside hose reel with a second hose on a curbside side of the refueling vehicle opposite the driver's side configured such that fuel product is deliverable from both sides of the refueling vehicle through at least one of the first and second hoses without having to reposition the refueling vehicle.

2. The refueling vehicle of claim 1, wherein each hose has its own spliced connection leading to a connector for a tank-to-tank fuel product transfer, where a first connector for the tank-to-tank fuel product transfer coupled to the spliced connection is a fuel nozzle on that hose configured to supply the fuel product and a second connector for the tank-to-tank fuel product transfer coupled to the spliced connection is an American Petroleum Institute (API) connector.

3. The refueling vehicle of claim 1, wherein:
   at least one of the hose reels is an electric-powered rewind hose reel, and
   the first hose is configured to dispense a different type of fuel product than the second hose.

4. The refueling vehicle of claim 1, further comprising a command module that has a display screen to at least read text on and at least one of a wireless data transfer system and a cellular data transfer system, wherein the fuel tank extends over the rear axle and the set of rear wheels near a rear bumper of the refueling vehicle.

5. The refueling vehicle of claim 1, wherein:
   the driver's side hose reel, the curbside hose reel, and the fuel dispensing module are located between the fuel tank and the cab, and
   the fuel tank is located over the rear axle and the set of rear wheels in order to distribute a greater proportion of the weight of the fuel tank and contents thereof onto the rear axle as compared to the front axle.

6. The refueling vehicle of claim 1, further comprising one or more safety light bars, wherein each of the safety light bars is:
   attached to a mechanical arm that is connected with an actuator, and
   transitionable between a vertical orientation and a horizontal orientation through actuation of the actuator, wherein the horizontal orientation extends outward from a side of the refueling vehicle.

7. The refueling vehicle of claim 6, wherein at least one of the one or more safety light bars include a plurality of LEDs that are configured to be operable to provide i) continuous illumination, ii) flashing illumination, or iii) a combination of continuous and flashing illumination when in the horizontal orientation.

8. The refueling vehicle of claim 7, where the mechanical arm is rotatably connected with another portion of the refueling vehicle with a pin connection having a removable pin to allow the mechanical arm to be disconnected the mechanical arm gets stuck in the horizontal orientation.

9. A method of dispensing fuel product from a refueling vehicle, comprising:
   causing one or more safety light bars mounted on the refueling vehicle to transition from a vertical orientation to a horizontal orientation that extends outward from the refueling vehicle to form a safe working zone, wherein each of the safety light bars is attached to a mechanical arm that uses an actuator to transition between the vertical orientation and the horizontal orientation;
   exiting the refueling vehicle and approaching a fuel dispensing module of the refueling vehicle that is located within the safe working zone created by the one or more safety light bars mounted on the refueling vehicle;
   selecting a hose reel and hose from the fuel dispensing module, wherein the fuel dispensing module includes a driver-side hose reel with a first hose on a driver's side of the refueling vehicle and a curbside hose reel with a second hose on a curbside side of the refueling vehicle opposite the driver's side of the refueling vehicle; and
   starting a fueling operation to dispense the fuel product via the selected hose from a fuel tank of the refueling vehicle that has multiple compartments that are configured to separately store multiple different types of fuel.

10. The method of dispensing fuel product from the refueling vehicle of claim 9, further comprising:
    after completing the fueling operation, stowing the selected hose in the fuel dispensing module by winding the selected hose onto the selected hose reel,
    entering the cab of the refueling vehicle from the fuel dispensing module, wherein the fuel dispensing module is located directly behind the cab, and causing, from the cab, the one or more safety light bars mounted on the refueling vehicle to transition from the horizontal orientation to the vertical orientation using the actuator.

11. A method of assembling a refueling vehicle, comprising:
assembling a cab, a fuel tank having multiple compartments configured to separately store different types of fuel, a front axle and a set of front wheels, a rear axle and a set of rear wheels, and a fuel dispensing module into the refueling vehicle, wherein the fuel dispensing module;
includes a driver-side hose reel with a first hose on a driver's side of the refueling vehicle and a curbside hose reel with a second hose on a curbside side of the refueling vehicle opposite the driver's side of the refueling vehicles.

12. The method of assembling the refueling vehicle of claim 11, wherein each hose has a corresponding spliced connection leading to a corresponding connector for a tank-to-tank fuel product transfer.

13. The method of assembling the refueling vehicle of claim 11, wherein at least one of the driver-side hose reel and the curbside hose reel is an electric-powered rewind hose reel.

14. The method of assembling the refueling vehicle of claim 11, where the fuel tank extends over the rear axle and the set of rear wheels near a rear bumper of the refueling vehicle.

15. The method of assembling the refueling vehicle of claim 11, wherein the fuel tank is located over the rear axle and the set of rear wheels in order to distribute a greater proportion of the weight of the fuel tank and contents thereof onto the rear axle as compared to the front axle.

16. The method of assembling the refueling vehicle of claim 11, further comprising one or more safety light bars configured to be used to form a safe working zone, where each of the safety light bars is attached to a mechanical arm that is configured to be transitionable from a vertical orientation to a horizontal orientation that extends outward from the refueling vehicle through actuation of a corresponding actuator.

17. The method of assembling the refueling vehicle of claim 16, wherein the one or more safety light bars include a plurality of LEDs, wherein the LEDs are configured to provide i) continuous illumination, ii) flashing illumination, or iii) a combination of continuous and flashing illumination when in the horizontal orientation.

18. The method of assembling the refueling vehicle of claim 17, where the mechanical arm is connected with another portion of the refueling vehicle via a pin connection with a removable pin to allow the mechanical arm to be disconnected when the mechanical arm gets stuck in the horizontal orientation.

* * * * *